(12) United States Patent
Van Acht et al.

(10) Patent No.: US 7,913,110 B2
(45) Date of Patent: Mar. 22, 2011

(54) ELECTRONIC CIRCUIT WITH A MEMORY MATRIX THAT STORES PAGES INCLUDING EXTRA DATA

(75) Inventors: Victor M. G. Van Acht, Waalre (NL); Nicolaas Lambert, Waalre (NL)

(73) Assignee: NXP B.V., Eindhoven (NL)

( * ) Notice: Subject to any disclaimer, the term of this patent is extended or adjusted under 35 U.S.C. 154(b) by 326 days.

(21) Appl. No.: 12/281,983

(22) PCT Filed: Mar. 5, 2007

(86) PCT No.: PCT/IB2007/050719
§ 371 (c)(1), (2), (4) Date: Sep. 6, 2008

(87) PCT Pub. No.: WO2007/102117
PCT Pub. Date: Sep. 13, 2007

(65) Prior Publication Data
US 2009/0070637 A1    Mar. 12, 2009

(30) Foreign Application Priority Data
Mar. 7, 2006 (EP) .................................... 06110785

(51) Int. Cl.
*G06F 11/00* (2006.01)
(52) U.S. Cl. ................ 714/6; 714/764; 714/768
(58) Field of Classification Search ............... 714/6, 764, 714/766, 768
See application file for complete search history.

(56) References Cited

U.S. PATENT DOCUMENTS

| | | | | |
|---|---|---|---|---|
| 5,774,643 A * | 6/1998 | Lubbers et al. | ................. | 714/20 |
| 5,805,799 A | 9/1998 | Fredrickson et al. | | |
| 5,956,743 A | 9/1999 | Bruce et al. | | |
| 5,978,953 A * | 11/1999 | Olarig | ........................... | 714/768 |
| 6,772,383 B1 * | 8/2004 | Quach et al. | .................. | 714/746 |
| 6,971,041 B2 * | 11/2005 | DeSota et al. | .................... | 714/6 |
| 7,028,150 B2 * | 4/2006 | McAllister et al. | ........... | 711/156 |
| 2003/0009720 A1 * | 1/2003 | Hanano | ........................ | 714/768 |
| 2004/0199851 A1 * | 10/2004 | Quach et al. | .................. | 714/758 |
| 2004/0237022 A1 * | 11/2004 | Karpuszka et al. | ........... | 714/764 |

FOREIGN PATENT DOCUMENTS
EP    1416380 A    5/2004

* cited by examiner

*Primary Examiner* — Marc Duncan

(57) ABSTRACT

An apparatus comprises a memory with a matrix (10) with rows and columns of memory cells. A read access circuit (14, 16, 18) executes a read command to read a retrieval unit comprising data from a row of the memory cells from the matrix (10) and to output data from the retrieval unit. A processing circuit (12) coupled to the read access circuit (14, 16, 18) is configured to execute an extra read operation involving issuing the read command, receiving the extra data (24), performing error detection on only the extra data (24), using an error detecting code in which the extra data is coded, conditionally performing error correction on the data from the extra data (24) using data from the retrieval unit including the payload data (22), according to an error correcting code in which the retrieval unit is coded, if the error detection indicates an error in the extra data (24). The processing circuit (12) performs further processing using the data from the extra data (22) or the corrected extra data, dependent on whether the error detection indicates an error in the extra data (22).

8 Claims, 2 Drawing Sheets

ELECTRONIC CIRCUIT WITH A MEMORY MATRIX THAT STORES PAGES INCLUDING EXTRA DATA

The invention relates to an electronic circuit and a method of reading data from a memory matrix in an electronic circuit.

U.S. Pat. No. 5,956,743 describes a flash memory that stores pages of data in combination overhead bytes that represent address data and error correction data.

U.S. Pat. No. 5,805,799 describes a data encoding technique for communication and storage in computer systems. Herein overhead bytes are included in a page of data that represent the logical address of the page and error correction data. The error correction data is used to verify correctness of the logical address.

Error correction is desirable in flash memory in order to correct errors in the stored data. Conceptually error correction uses an error correcting code which defines a set of codewords that is a subset of datawords that can be stored in the memory. Words are selected from the codewords under control of the data to be encoded and the selected codewords are stored. In practice codewords are usually realized by adding check codes computed from the data that is encoded. Upon retrieval, syndrome numbers are computed from the retrieved data and check words and the syndrome numbers are used to compute corrections.

Access to flash memory typically makes use of logical to physical address translation. During normal operation a translation table is to perform this translation, which stores physical addresses of blocks at table addresses defined by logical addresses. The logical addresses of blocks are also stored as auxiliary data with the blocks themselves. This makes it possible to construct the translation table by determining which block storage locations contain valid blocks, and retrieving the logical addresses of these blocks from the storage locations.

Several types of read access are known for flash memory. In one type of flash memory the read access circuit supports a read command which causes retrieval of information from a row of memory cells in a matrix of rows and columns of memory cells. This information includes the stored data ("payload data" in the following) plus check words plus logical address information (one example of what will more generally be termed "extra data"). The payload data, check word and extra data are shifted out serially from the read access circuit, typically word for word. The check words and extra data typically are shifted out last. The read access circuit allows shifting to be discontinued, for example when the extra data is not needed. In another type of flash memory the read access circuit supports a normal type read command and a read spare command. In response to a normal type read command the read access circuit reads the row and outputs only the payload data and check words from the row. In response to a "read spare" type read command the read access circuit reads the row and outputs only the extra data and the check words (together called "spare data").

When error correction of the extra data is needed, one option is to cover both the payload data and the extra data under the error correcting code. This means that, to retrieve the extra data, the entire row needs to be output from the read access circuit, at the expense of considerable overhead time compared to the output time needed for a "read spare" type read command. An alternative could be to use a separate error correcting code for the extra data, but this comes at the expense of storage overhead, because the storage efficiency of error correcting codes decreases with reduction of the size of the encoded data.

Among others, it is an object of the invention to provide for retrieval of extra data from rows of a memory matrix in a way that permits correction of errors, without incurring the storage overhead for an error correcting code for the extra data by itself and with on average less output time overhead than needed for correction using an error correcting code for the entire row.

An apparatus according to claim 1 is provided. Herein a processing circuit is used as well as a memory comprising a matrix with rows and columns of memory cells. The matrix stores retrieval units with logically addressable payload data and extra data. The extra data may for example include information about a logical address of the payload data from the retrieval unit. The logical addresses define a logical address space that is used by the processing circuit to address payload data. The logical address space contains logical addresses that address data from the units without address gaps between logical addresses in successive retrieval units. In a typical example data in the payload data is logically addressed by an address that contains a series of digits, part of the digits being used to form the logical address and another part of the digits being used to form an address within the payload data.

The extra data is outside the logical address space in the sense that it is not addressed by the logical addresses from an address space that is used by the processing circuit for the payload data. The processing circuit is configured to execute an extra read process comprising error detection on only the extra data, making use of an error detecting code in which the extra data is coded, and conditionally performing error correction on the extra data using data from the retrieval unit including the payload data, according to an error correcting code in which the retrieval unit is coded, if the error detection indicates an error in the extra data. That is, the extra data and the payload data share the same error correction redundancy. Thus, a fast read out of extra data is possible in the absence of errors and a slower readout in the case of errors. The error detecting code may also have some error correcting capacity, enabling small corrections which require the payload data, but this is not necessary. Preferably the error correcting capacity of the error correcting code is larger that the error correcting capacity, if any, of the error detecting code. This reduces the overhead for the error detection code.

In an embodiment the read access circuit of the memory is configured to read the retrieval unit and to serially output data from the retrieval unit in response to a read command. Preferably the processing circuit is configured to obtain the extra data from a part of the retrieval unit that is output in response to the read command before all of the payload data. This provides maximum speed, since not payload data needs to be read in the extra read process in the absence of an error in the extra data. But of course speed is already gained if at least part of the payload data is not output before the extra data.

During a process for reading the payload data, preferably both the extra data and the payload data are read and used to perform error correction of the payload data These and other objects and advantageous aspects of the invention will become apparent from a description of exemplary embodiments, using the following figures.

FIG. 1 shows an electronic circuit with a memory matrix

FIG. 2 schematically shows a page of data stored in a memory matrix

Figure 1:
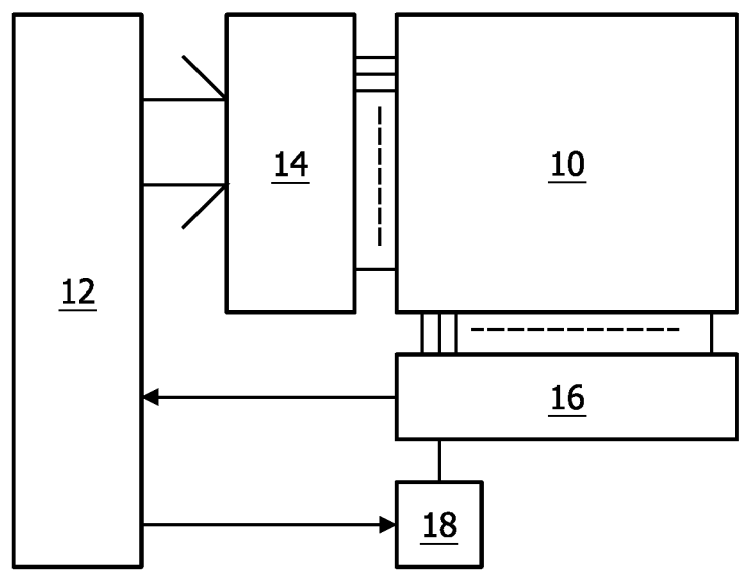

FIG. 1 shows part of an electronic circuit with a memory matrix 10. It must be emphasized that this circuit is shown merely by way of a simple example. In practice more complicated circuits will be used. Memory matrix 10 comprises rows and columns of memory cells (not shown individually). The electronic circuit comprises a data processing circuit 12, a row addressing circuit 14, a read circuit 16 and a read control circuit 18. Data processing circuit 12 has a row address output coupled to row addressing circuit 14, a data input coupled to read circuit 16 and a read command output coupled to read control circuit 18. Row addressing circuit 14 has row selection outputs coupled to row control conductors of memory matrix 10 that are connected to memory cells of respective rows. Read circuit 16 has inputs coupled to column data conductors from memory matrix 10 that are connected to memory cells from respective columns. Read control circuit 18 has a control output coupled to read circuit 16. Read circuit 16 and read control circuit 18 form a read access circuit (and strictly speaking row addressing circuit 14 may also be considered part of the read access circuit). It should be appreciated that many variations are possible. For example, the row address output may double as read command output. As another example a plurality of matrices 10 may be addressed in parallel, so that a retrieval unit of a set of rows is provided for, data being output from the read circuit 16 for different ones of these matrices in series.

In operation processing circuit 12 supplies read commands accompanied by row addresses. Row addressing circuit 14 selects a row of matrix 10 (the content thereof being called a retrieval unit in this embodiment) under control of the row address in response to a read command. Matrix 10 supplies data from the selected row to read circuit 16. Read circuit 16 serially shifts out data from the row to processing circuit 12. "Serially" as used herein may means bit for bit supply of the data, but in general it will mean shifting successive units of data that contain a plurality of bits that are supplied in parallel. The data from a row of memory cells in memory matrix 10, or a combination of such rows from different matrices that are read out in parallel will be called a "page".

Figure 2:
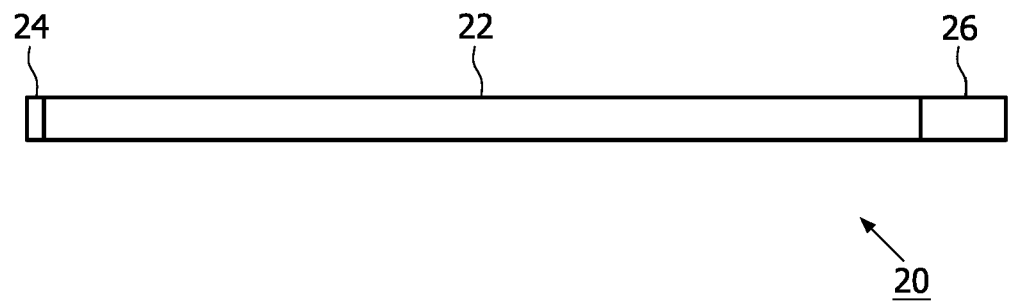

FIG. 2 illustrates a page 20 of data, which is an example of a retrieval unit. Page 20 contains payload data 22, extra data 24 and correction data 26. The position of data in the figures corresponds to the time at which the data is shifted out, data that is shown more to the right being shifted out later. Payload data 22 takes up the majority of the page. Payload data 22 corresponds to data that has been supplied initially from outside for storage in a row of matrix 10 (or in rows of a plurality of matrices). Extra data 24 and correction data 26 corresponds to data that has been added to the initial payload data by the processing circuit 12 for management of storage in matrix 10 (or a plurality of matrices). Extra data 24 contains error detection data for the extra data independent of a remainder of page 20, such as one or more parity bits for the extra data. Furthermore, in an embodiment, extra data 24 contains a logical address for the payload data 22 for example. That is, the logical address may be a logical block address of a block of which the row forms part, or a page address of the row. In other embodiments, extra data 24 contains statistical data about the number of times the row has been programmed and/or a version number and/or the logical block address. Correction data 26 comprises data to make the content of page 20 a codeword from an error correcting code. As shown, the position of extra data 24 is such that it will be output first by read circuit 16 when the page is output, followed by payload data 22 and correction data 26.

In an embodiment read control circuit 18 supports a read command for reading and serially outputting data from the entire row, including the extra data, the payload data and the error correction data. During normal operation processing circuit 12 generates or receives read instructions associated with logical addresses (e.g. accompanied by a logical address, or for a series of successive logical addresses), translates the logical addresses into physical addresses and issues read commands for retrieval units with the physical addresses. Read circuit 16 returns full pages in response to these normal read commands. Processing circuit 12 corrects errors in the page using the correction data 26, in accordance with the error correcting code for which the correction data has been generated (e.g. a Reed Solomon code). Subsequently the corrected payload data is used.

Thus, it the extra data is effectively invisible for normal read operations that use logical addresses to read data. In response to such read operations only the payload data is forwarded subsequent to the error correction. As used herein this means that the extra data is not logically addressable by read instructions for logical addresses. Typically, data in the payload data is logically addressed by an address that contains a series of digits, of which part are used to form the logical address and another part is used to form an address within the payload data. The latter part does not address extra data: the last consecutive address A that addresses payload data in a retrieval unit is followed by a next consecutive address A+1 that addresses data in the payload data for another logical address.

Figure 3:
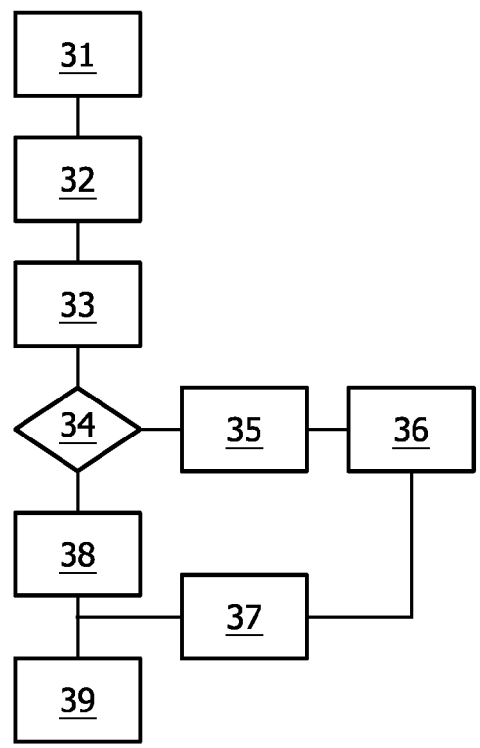
FIG. 3 shows a flow-chart of a reading operation

FIG. 3 shows a flow-chart of a read operation of the extra data. The steps of this flow chart may be part of a translation table recovery process for example, wherein logical addresses are recovered from physical pages and a logical to physical address translation table is constructed from the logical addresses. In a first step 31 processing circuit 12 outputs a physical page address and a read command. In a second step 32 row addressing circuit 14 selects an addressed row that stores the page, matrix 10 outputs signals dependent on data in the memory cells of the addressed row, read circuit 16 converts the signals into digital data signal and read circuit 16 outputs digital data signals starting from the part of the row that contains extra data 24 to processing circuit 12. In a third step 33 processing circuit 12 receives the extra data and computes a check value (e.g. a parity value) from the extra data. In a fourth step 34 processing circuit 12 tests whether the check value indicates an error in the extra data. If not processing circuit 12 causes output of the data to be terminated in eight step 38 and proceeds with further processing of the extra data in ninth step 39, such as for example construction of a logical to physical address mapping table.

If fourth step 34 indicates an error, processing circuit 12 executes a fifth step 35, continuing to receive data from the row from read circuit 16. This continues until processing circuit 12 has received the payload data 22 and the correction data 26. In a sixth step 36 processing circuit 12 computes corrections from the received data for the page 20. In a seventh step 37 processing circuit 12 applies that part of the corrections that relates to the extra data 24 to the extra data 24. From there processing circuit 12 performs the further processing of ninth step 39, but using the corrected extra data instead of the original extra data.

Some commercially available flash memories support two types of read command: a normal read command and a read spare command. A read access circuit executes the normal read command by reading and outputting all data from a page. A read access circuit executes the read spare command by reading all data from a page and outputting only the last few bits that would be output behind all other bits in response to the normal read command. These last few bits contain the spare data. Thus the spare data can be accessed without outputting all the other data. However, if it is decided that the other data is needed after inspecting only the spare data from a read spare command, a new normal read command is needed which involves reading the data again from the memory matrix.

To avoid this, it is preferred in an embodiment of the present invention to deviate from the known approach of storing the spare data so that it is output behind the other data, by storing the extra data, including error correction data so that it will be output before the other data in response to the normal read command.

This has the disadvantage that some delay is introduced before the payload data can be output. In another embodiment of the invention a modified flash memory with a different set of read commands is provided for. In this embodiment read circuit 16 is configured to support different types of read command, comprising a new read bypass spare command and a normal read command. In this embodiment read circuit 16 is configured to read and serially output data from the entire row, including the extra data, the payload data and the correction data, in response to the normal read command, with the option of discontinuing serial output when the error detection data in the extra data indicates that there is no error. Read circuit 16 is configured to bypass the extra data in response to the read bypass spare command and outputs at least the payload data. However, because the correction data 26 typically applies to the combination of the payload data 22 and the extra data 24, it is typically desirable to read both extra data and payload data in order to perform error correction when payload data is needed.

Figure 4:
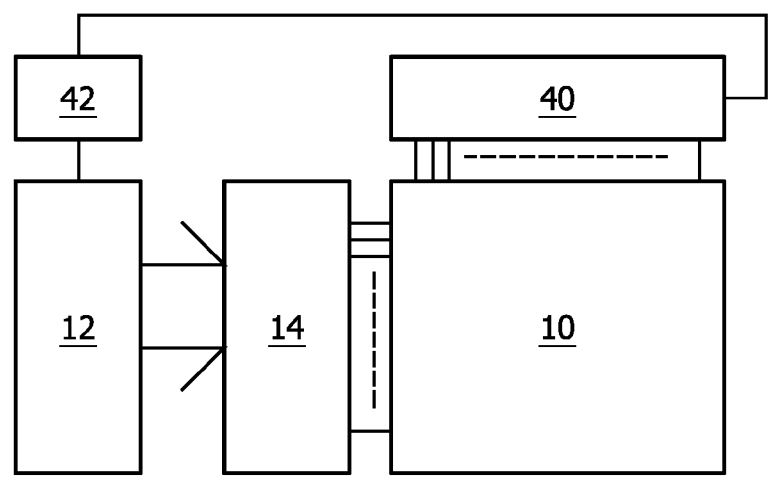
FIG. 4 shows an electronic circuit with a memory matrix

FIG. 4 shows a part of the electronic circuit that is concerned with writing (programming) of data. The electronic circuit comprises a write circuit 40 and an encoder 42 coupled between processing circuit 12 and matrix 10. Although a separate encoder 42 is shown, it should be appreciated that instead the function of encoder 42 may be implemented as part of processing circuit 12. In operation, when processing circuit 12 needs to write a page of data for a logical address, processing circuit selects a physical address and supplies the page with extra data comprising the logical address to encoder 42, with a command to write the data at the selected physical address.

Encoder 42 computes check data from the extra data and correction data from the combination of the page, the extra data and the check data. The check data is for example a parity bit or it comprises a plurality of parity bits. The check data should allow at least for detection of one bit errors in the extra data. The correction data should allow for n bit errors (n=4 for example). Methods of computing correction data are known per se. For example Reed-Solomon codes may be used.

Encoder 42 supplies the extra data, the check data, the payload data and the correction data to write circuit 40 and causes this data to be written into matrix at locations so that the extra data and check data will be output first.

Processing circuit 12 may be implemented as a programmable processor programmed to perform at least the described extra read process, or as dedicated hardware designed to do so, or as a mixture of programmable and dedicated hardware. Processing circuit 12 may use the extra read process for example in order to build up a logical to physical address translation table for use to execute logical read instructions. Processing circuit 12 may be provided on a same semi-conductor chip as matrix 10 or on a separate chip. In one embodiment processing circuit 12 is designed to receive logical read instructions, associated with logical addresses and to return payload data in response to these read instructions. In another embodiment processing circuit may generate the logical read instructions itself.

Although an embodiment has been described wherein only error detecting capacity of the check data is used, in a further embodiment the check data is selected so that it provides for a limited correction capability, e.g. for correcting one bit errors. In this embodiment, processing circuit 12 computes a count of errors from the extra data and the check data during third step 33, and corrects errors in the extra data if the count of detected errors is below a predetermined threshold. If this correction is possible, processing circuit bypasses fifth step 35 etc. after fourth step 34. Thus, the complete word needs to be read less frequently.

Although embodiments have been shown wherein the extra data is output first from read circuit 16, followed first by payload data and subsequently by correction data, it should be appreciated that other sequences could be used. For example correction data may be output before the payload data, or intermixed with the payload data. Also, when a non-systematic code is used, there need not be a sharp distinction between payload data and correction data.

In another example, extra data is output after the payload data, but this has the disadvantage that the payload data must always be output to reach the extra data, which results in considerable overhead. In order to overcome this, read circuit 16 may be configured to support an additional read extra command which outputs the extra data bypassing the payload data and a continue command, which causes the payload data to be output after the extra data of the read extra command, using data read from memory matrix 10 in response to the read extra command, without reading this data anew from memory matrix 10. However, it will be appreciated that outputting the extra data first in response to a standard read command for all data simplifies the circuit with a minimum of timing overhead. Similarly, the extra data may be output preceded by some of the payload data, at a predetermined position among the payload data. This may also reduce the timing overhead.

Furthermore, although examples have been shown wherein a single row from a single memory matrix 10 is read as retrieval unit and used to obtain corrected extra data, it should be appreciated that instead of a retrieval unit of a single row, a retrieval unit of a plurality of rows, from different matrices or from the same matrix may be used, the correction data applying to the retrieval unit of a plurality of rows. In this case the extra data may be stored in one row in the retrieval unit, the plurality of rows being read and output when the error detection indicates an error in the extra data.

The invention claimed is:

1. An apparatus comprising:
a memory comprising a matrix with rows and columns of memory cells;
a read access circuit configured to execute a read command to read a retrieval unit comprising data from a row of the memory cells from the matrix and to output data from the retrieval unit, the data in the retrieval unit comprising payload data and addressable extra data outside an address space for the payload data;
a processing circuit coupled to the read access circuit and configured to execute an extra read process comprising issuing the read command, receiving the extra data, to perform error detection on only the extra data, making use of an error detecting code in which the extra data is coded, conditionally performing error correction on the data from the extra data using data from the retrieval unit including the payload data, according to an error correcting code in which the retrieval unit is coded, if the error detection indicates an error in the extra data, the processing circuit being configured to perform further processing using the data from the extra data or the corrected extra data, dependent on whether the error detection indicates an error in the extra data;

wherein the read access circuit is configured to read the retrieval unit and to serially output data from the retrieval unit in response to the read command, the processing circuit being configured to obtain the extra data from a part of the retrieval unit that is output in response to the read command at least partly before the payload data, and causing the output to cease if the error detection indicates absence of an error in the extra data.

2. An apparatus according to claim 1, wherein the read access circuit is configured to support execution of a normal read operation, when the payload data is needed for payload data processing, by reading the payload data and the extra data and performing error correction on the payload data using data from the payload data and the extra data according to the error correcting code.

3. An apparatus according to claim 1, wherein a first error correcting capacity of the error correcting code that the processing circuit is configured to use is higher than a second error correcting capacity, if any, of the error detecting code that the processing circuit is configured to use.

4. An apparatus according to claim 1, wherein the processing circuit is configured to receive the payload data for writing, the payload data being associated with a logical address for the payload data, to select a physical address corresponding to the retrieval unit for the payload data, and to include information about the logical address in the extra data.

5. A method of operating a memory comprising a matrix with rows and columns of memory cells, the method comprising writing data to a retrieval unit that comprises at least one of the rows, the data comprising payload data and extra data outside an address space for the payload data, the payload data and the extra data together being part of a codeword of an error correcting code, the extra data being selected from codewords of an error detecting code;

reading the data from the retrieval unit, performing error detection on only the extra data using the error detecting code;

conditionally performing error correction on the data from the extra data using the payload data and the extra data from the retrieval unit according to the error correcting code, if the error detection indicates an error in the extra data;

performing further processing using the data from the extra data or the corrected extra data, dependent on whether the error detection indicates an error in the extra data;

the method comprising issuing a read command to the memory, which causes the memory to read the retrieval unit and to serially output data from the retrieval unit, the extra data being output at least partly before the payload data in response to the read command, if the output is not made to cease;

causing the output to cease if the error detection indicates absence of an error in the extra data.

6. A method according to claim 5, the method comprising reading the payload data and the extra data when the payload data is needed for payload data processing and performing error correction on the payload data using data from the payload data and the extra data from the retrieval unit according to the error correcting code.

7. A method according to claim 5, wherein a first error correcting capacity of the error correcting code that is used is higher than a second error correcting capacity, if any, of the error detecting code that is used.

8. A method according to claim 5, comprising receiving the payload data in association with a logical address for the payload data, selecting a physical address in the matrix for the retrieval unit for the payload data and including information about the logical address in the extra data.

* * * * *